United States Patent [19]

Sawada et al.

[11] Patent Number: 4,839,226
[45] Date of Patent: Jun. 13, 1989

[54] MAGNETO-OPTICAL RECORDING MEDIUM

[75] Inventors: Yasuo Sawada, Machida; Hajime Machida, Tokyo, both of Japan

[73] Assignee: Ricoh Company, Ltd., Tokyo, Japan

[21] Appl. No.: 104,217

[22] Filed: Oct. 5, 1987

[30] Foreign Application Priority Data

Oct. 3, 1986 [JP] Japan .................................. 61-236016

[51] Int. Cl.⁴ .............................................. G11B 11/10
[52] U.S. Cl. ..................................... 428/336; 428/431; 428/469; 428/471; 428/472; 428/694; 428/697; 428/701; 428/702; 428/900
[58] Field of Search ............... 428/694, 900, 336, 431, 428/469, 471, 472, 697, 701, 702; 365/122; 360/131–135; 369/13, 288; 430/945; 252/62.56, 62.57, 62.58, 62.59

[56] References Cited

U.S. PATENT DOCUMENTS

| | | | |
|---|---|---|---|
| 4,414,650 | 11/1983 | Ohta et al. | 365/122 |
| 4,417,290 | 11/1983 | Tanaka et al. | 360/131 |
| 4,493,887 | 1/1985 | Peeters et al. | 430/275 |
| 4,543,198 | 9/1985 | Kamiyama et al. | 252/62.59 |
| 4,544,602 | 10/1985 | Kobayashi et al. | 428/336 |
| 4,562,105 | 12/1985 | Michida et al. | 428/161 |
| 4,670,322 | 6/1987 | Nakamura et al. | 428/172 |
| 4,690,861 | 9/1987 | Nakamura et al. | 428/900 |

Primary Examiner—George F. Lesmes
Assistant Examiner—James B. Monroe
Attorney, Agent, or Firm—Oblon, Fisher, Spivak, McClelland & Maier

[57] ABSTRACT

A magneto-optical recording medium is disclosed, which comprises a transparent substrate, a magnetic oxide layer formed on the substrate, and band-shaped reflection layers formed on the magnetic oxide layer.

21 Claims, 1 Drawing Sheet

MAGNETO-OPTICAL RECORDING MEDIUM

BACKGROUND OF THE INVENTION

The present invention relates to a magneto-optical recording medium capable of recording information and reproducing the same by utilizing magneto-optical effect.

Conventionally there is known a magneto-optical recording medium capable of recording information and reproducing the same with application of a light beam such as a laser beam.

In such a magneto-optical recording medium, the recording of information is performed by writing information with a light beam in the form of reversed magnetic domains in a perpendicularly magnetized magnetic thin layer, utilizing the optical thermal effect of the applied light beam, and the recorded information is read from the magnetic thin layer by utilizing the magneto-optical effect thereof.

When the recorded information is read from such magneto-optical recording medium, or the writing of information therein or the deletion of information therefrom is performed with application of a laser beam thereto, a guide track for accurately guiding the position of the application of the laser beam is necessary. Such a guide track is particularly important when information is recorded with high density, since the guide track can accurately locate the position of any small recording pattern so that reliable tracking servo can be attained.

The conventional guide tracks are grooves formed in the recording medium, having, for example, a pitch of about 1.5 $\mu$m to about 3 $\mu$m, a depth of about $\frac{1}{8}$ n x$\lambda$, and a width of about 0.5 $\mu$m to about 0.8 $\mu$m. The guiding of the laser beam is performed by utilizing the diffraction of light.

In the recording layers of the conventional magneto-optical recording media, transition metal—heavy rare earth element amorphous alloys such as TbFe, TbFeCo, GdFe and GdFeCo are in general use, and the reproduction output (C/N) thereof has recently exceeded 50 dB, partly because of the recent improvement of a pickup and other devices. However, these recording layers are extremely susceptible to oxidation. In order to improve the durability of the recording layers, it has been proposed to add some additives such as Al and Ti to the recording layers or to provide a protective layer on the recording layer. These methods, however, are not yet sufficient for attaining the desired improvement of the recording layer.

Under such circumstances, magnetic oxide films, made of, for example, barium ferrite, cobalt spinal ferrite or iron garnet, having semipermanent durability and large magneto-optical effect, have been proposed. Such magnetic oxide films can be prepared by the sputtering method, the thermal decomposition method, and the vacuum deposition method, provided that the substrate temperature must be generally set higher than in the case of the ordinary fabrication of magneto-optical recording media. Therefore, generally employed plastic substrates cannot be employed when such magnetic oxide films are formed, so that a heat resistant substrate such as glass substrate has to be employed.

When a plastic substrate is employed, tracks can be formed without difficulty, for instance, by using a conventional method such as the injection method. However, it is difficult to form a track directly in a glass substrate.

In the case of a glass substrate, the grooves are generally formed by the etching method. However, when the etching surface of the substrate is uneven or not smooth, the crystal orientation of a magnetic oxide film formed on the substrate is adversely affected by such uneven etching surface. The result is that the C/N becomes poor.

In the magneto-optical recording medium using a magnetic oxide film, the Faraday effect of the light transmitted through the magnetic oxide film is utilized. Therefore, it is preferable to obtain a large Faraday rotation angle by making the magnetic oxide film as thick as, for instance, 1,000 Å to 10,000 Å.

However, if such a thick magnetic oxide film is formed on a substrate having grooves, the groove portions from which tracking signals are actually generated are deformed by the formation of the magnetic oxide film thereon. As a result, the track servo and C/N deteriorate.

Japanese Laid-Open Patent Application No. 59-98332 discloses a magneto-optical recording medium comprising a flat substrate, a magnetic oxide layer formed thereon, a transparent intermediate layer formed on the magnetic oxide layer, a synthetic resin layer having step portions on the transparent intermediate layer, and a reflection layer on the synthetic resin layer. In this reference, it is disclosed that by appropriately setting the thickness of the step portion of the synthetic resin layer, and the thickness of the other layers, and by forming reflection-preventing areas and non-reflection-preventing areas, tracking servo signals are obtained. In this structure, the magnetic oxide layer is formed on the flat substrate so that the above mentioned shortcoming of the conventional magneto-optical recording medium is eliminated.

However, in the above-mentioned magneto-optical recording medium, the thickness of each layer has to be strictly made uniform within a predetermined range. However, it is extremely difficult to form each layer with a predetermined thickness accurately over a large area as in a disk-shaped recording medium. Furthermore, the above-mentioned synthetic resin layer is formed with a photo-resist. In such a case, there is the risk the grooves formed in the synthetic resin layer may be deformed with time by the heat generated with application of laser beams thereto in the course of writing information and deleting the same.

Japanese Laid-Open patent application No. 57-183647 discloses a magneto-optical memory element comprising a substrate, a magnetic thin layer formed thereon having an axis of easy magnetization perpendicular to the surface of the magnetic thin layer thereof, and band-shaped reflection layers on the magnetic thin layer. In this reference, it is disclosed that as the magnetic layer, layers of transition metal—heavy rare earth amorphous element alloys such as TbFe and a layer of MnBi can be employed. However, these magnetic layers are easily corroded and the above-mentioned band-shaped reflection layers cannot be prepared by the Wett method utilizing photolithography in spite of its high productivity.

Japanese Laid-Open patent application No. 57-40768 discloses a magneto-optical recording medium including a transparent protective layer, and a metal overcoated layer having a melting point which is lower than that of any of the magneto-optical recording medium and the transparent protective layer. In this magneto-optical recording medium, guide tracks are formed by vaporizing the metal overcoat layer in the shape of a band with application of laser beams thereto. However, as long as this method is employed for forming guide tracks, the productivity of the magneto-optical recording medium is poor. Even if it is tried to etch the metal overcoat layer by photolithography, it is difficult to employ the Wett method having high productivity without deteriorating the magnetic recording medium since it contains an amorphous alloy film made of, for instance, TbFe. The same thing can be said even when a protective layer is provided.

SUMMARY OF THE INVENTION

Accordingly, it is an object of the present invention to provide a magneto-optical recording medium using a magnetic oxide layer, which is capable of attaining accurate tracking and obtaining high C/N and suitable for mass production.

The above object of the present invention can be attained by a magneto-optical recording medium comprising a transparent substrate, a magnetic oxide layer formed on the substrate, and band-shaped reflection layers formed on the magnetic oxide layer.

DETAILED DESCRIPTION OF THE PREFERRED EMBODIMENTS

With reference to the accompanying drawings, the present invention will now be explained in detail.

Figure 1:
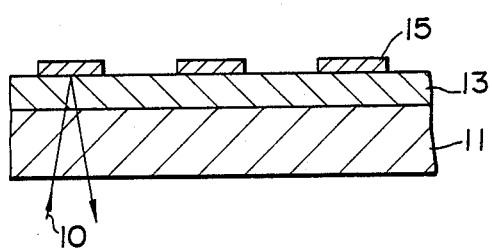
FIG. 1 through FIG. 4 are schematic cross-sectional views of examples of a magneto-optical recording medium according to the present invention.

FIG. 1 is a schematic cross-sectional view of an example of a magneto-optical recording medium according to the present invention, which comprises a transparent substrate 11, a magnetic oxide layer 13 formed on the transparent substrate 11, and band-shaped reflection layers 15 formed on the magnetic oxide layer 13. The information recorded or written in the magnetic oxide layer 13 is reproduced by application of a laser beam 10 to the transparent substrate 11 and detecting the Faraday effect of the laser beam reflected by the reflection layers 15. A tracking error signal is obtained by the difference between the intensity of the laser beam reflected by the portions in which the above-mentioned band-shaped reflection layers 13 are formed and the intensity of the laser beam reflected by the portions where there are no reflection layers 15, so that tracking is carried out in such a manner that the beam spot for writing and reproducing is set in the band-shaped portions. The band-shaped reflection layers 15 function as guide tracks. In the above magneto-optical recording medium, a track pitch is defined to be the total of the width of the band-shaped reflection layer 15 and the width of the portion adjacent to the reflection layer 15 where there is no band-shaped reflection layer 15. For accurate tracking, it is preferable that the width of each reflection layer 15 be in the range of 3/10 to 7/10 of the track pitch. This range of the width of the reflection layer can also be applied, not only to the recording medium of the present invention, but also to a magneto-optical recording medium comprising an amorphous magneto-optical recording layer.

The magnetic oxide layer 13 can be made of, for example, the following magnetic oxides having excellent perpendicular orientation:

(1) Magnetoplumbite-type ferrites $$MeO \cdot n[M_x Fe_{(2-x)} O_3] \qquad (I)$$

Me: at least one element selected from the group consisting of Ba, Pb, Sr and La;

M: one element or a combination of at least two elements which constitute a three-valence element or element group as a whole;

x: $0 \leq n < 2$ n: $5 \leq n \leq 6$.

(2) Garnet-type magnetic oxides $$[R_3][M^{3+}{}_y Fe^{3+}{}_{5-y}]O_{12} \qquad (II)$$

R: at least one element selected from the group consisting Y, Bi, Pb, Ca, Sr, Ba, La, Sm, Eu, Gd, Er, Tm, Yb, Lu, Pr, Nd, Ho and Dy;

M: at least one element selected from the group consisting of Ga, Al, V, Si, Ge, Co, Zn, Lu, Sc, Cr, Zr, Ti, Tb, Gd and Dy, by which Fe can be replaced;

y: $0 \leq y \leq 3$.

(3) Cobalt spinel-type magnetic oxides $$CO_x M_y Fe_{2-(x+y)} O_x \qquad (III)$$

M: at least one element selected from the group consisting of Al, Cr, Mn, Ni, Ti, Zn, Sn, Cu, Mg, Rh, V, Ga, Sb, Sc, Bi, Y, Su, Eu, Tb, Er, Yb, Ho, Dy, Tm, Gd, Sm, Pb, Re and Ru, by which Fe can be replaced;

x, y: $0 < x+y < 3$, $0 \leq y \leq 2$.

Such magnetic oxides have so high light transmittance that they can be formed into a thick layer by which it is possible to obtain a large Faraday rotation angle and to increase the C/N. It is preferable that the thickness of the magnetic oxide layer be 1000 Å or more, more preferably, in the range of 2000 Å to 5000 Å. The magnetic oxide layer can be formed by the conventional thin film formation methods such as sputtering, ion plating, vacuum deposition and pyrolysis.

The band-shaped reflection layer 15 works as guide track and can be formed into a spiral form or in the form of concentric circle. The band-shaped reflection layer 15 can be made of a metal, such as Au, Cu, Ag, Al, Nd, Rh, Cr, Pt, and Ru or an alloy such as Fe—Ni, stainless steel, nickel chrome steel and chromel.

In the example as shown FIG. 1, the band-shaped reflection layer 15 functions as a heat generating layer when writing information. Specifically, when writing information, it is necessary to heat the magnetic oxide layer 13 to a temperature higher than the Curie point thereof with application of a laser beam. However, the magnetic oxide layer 13 is so transparent to the laser beam that it does not generate heat sufficiently for writing information. Therefore, it is necessary that the reflection layer 15 absorb part of the applied laser beam to generate heat therefrom. For this purpose, it is preferable that the reflection layer 15 have a reflectance of 30% to 80% or an absorbance of 20% to 70%. Further, in order to avoid the defusion of the generated heat into the portions where no laser beams are applied, it is preferable that the reflection layer 15 have a heat conductivity of less than 0.25 cal/cm.sec.°C. at 20° C.

The band-shaped reflection layer 15 can be formed by forming a reflection film, for example, by vacuum deposition or sputtering and then patterning the reflection film by photolithography with the close contact exposure method using a photo mask having band-shaped patterns. Unlike the transition metal—heavy rare earth amorphous alloy films, the magnetic oxide layer is stable and therefore can be formed without difficulty by photolithography which includes an etching process.

Figure 5A:
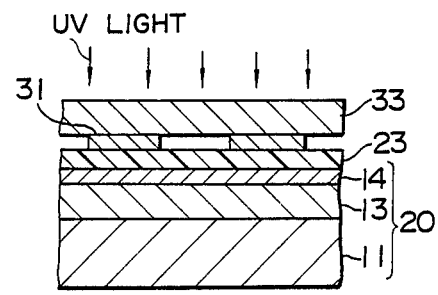
FIG. 5A through FIG. 5C are diagrams in explanation of a method of producing the magneto-optical recording medium according to the present invention.
Figure 5B:
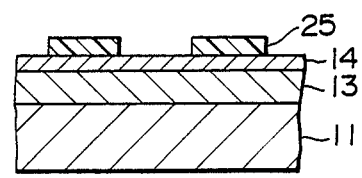
Figure 5C:
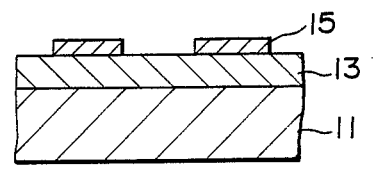

FIG. 5A through FIG. 5C are diagrams in explanation of the fabrication of a magneto-optical recording medium according to the present invention. As shown in FIG. 5A, a photoresist 23 is applied to a material 20 which comprises a substrate 11, a magnetic oxide layer 13 and a reflection film 14. A photo mask 33 having a particular pattern 31 is brought into close contact with the applied photoresist 23 and exposed to ultraviolet light. This is an exposure process.

Then as shown in FIG. 5B, development is performed so that the UV light applied portions are eliminated, whereby a resist pattern 25 is formed on the reflection film 14. This is a development process.

The portions of the reflection film 14 in which the resist pattern 25 is not formed are eliminated by etching. And then the resist pattern 25 is peeled off so that band-shaped reflection layer 15 is formed as shown in FIG. 5C. This is an etching and resist peeling-off process. In the above, wet etching and dry etching can be used equally.

Figure 6:
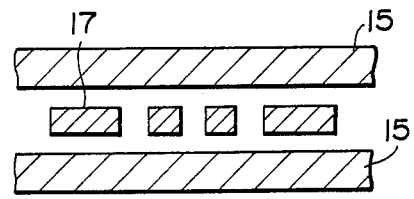
FIG. 6 is a plan view of an example of a pattern of band-shaped reflection layers.

Preformat signals such as track sector information can be produced by the presence or absence of a band-shaped pattern 17 as shown in FIG. 6.

As the substrate 11, any transparent substrates can be used which are made of a variety of glasses such as quartz glass, crystallized glass, Vycor glass, Pyrex glass, and aluminosilicate glass, and single crystals and polycrystals of garium.gadolinium.garnet (GGG), lithium tantalate, $Al_2O_3$ and MgO.

Figure 2:
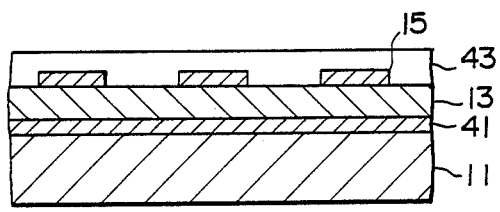

FIG. 2 is a cross-sectional view of another example of a magneto-optical recording medium according to the present invention. In this example, there is interposed an undercoat layer 41 between the substrate 11 and the magnetic oxide layer 13. In addition to this, a protective layer 43 is provided on a reflection layer 15.

The undercoat layer 41 serves as a layer for promoting the epitaxial growth of the magnetic oxide layer 13 and the crystal orientation of the magnetic oxide of the layer 13. As the undercoat layer 41, orientation films such as ZnO (001-plane), Mn-Zn ferrite (111-plane), Co spinel ferrite (111-plane), Co-Zn ferrite (111-plane) and MgO (111-plane) can be employed.

The protective layer 43 serves to protect the reflection layer 15 and can be made of an oxide such as $SiO_2$, SiO, $TiO_2$, ZnO and $Al_2O_3$, and a nitride such as AlN and $Si_3N_4$, C, and carbides such as TaC, TiC and ZrC.

Figure 3:
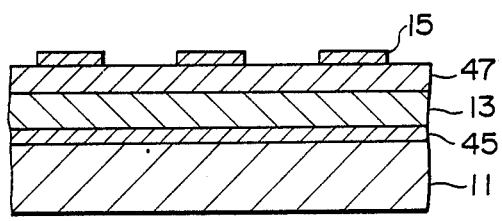

FIG. 3 is a schematic cross-sectional view of another example of a magneto-optical recording medium according to the present invention. In this example, a heat emitting undercoat layer 45 is interposed between the substrate 11 and the magnetic oxide layer 13, and furthermore a heat insulating layer 47 is interposed between the magnetic oxide layer 13 and the band-shaped reflection layers 15. The heat emitting undercoat layer 45 serves as an undercoat layer for appropriately orienting the crystal axis of the magnetic oxide at the time of forming the magnetic oxide layer 13, and as a heat emitting layer for heating the magnetic oxide layer 13 at the time of writing information by the application of laser beams.

Examples of a material for forming the heat emitting undercoat layer 45 are Co spinel ferrite, and Ni spinel ferrite. It is preferable that the thickness of the heat emitting undercoat layer 45 be in the range of about 0.1 $\mu$m to about 0.5 $\mu$m.

The heat insulating layer 47 serves as a layer for preventing the leakage of heat from the magnetic oxide layer 13 to the reflection layer 15. The heat insulating layer 47 can be made of a material having low heat conductivity and high light transmittance. Examples of such a material are $Si_xO_y$, $Si_xN_y$, SiC, $Al_2O_3$, $ZrO_2$, $ThO_2$, CaO, $CeO_2$, $HfO_2$, and BeO.

In the example as shown in FIG. 3, it is unnecessary for the reflection layer 15 to generate heat. Therefore, the reflection layer 15 can be made of a material having high reflectance such as Au, Cu, Ag and Al.

Figure 4:
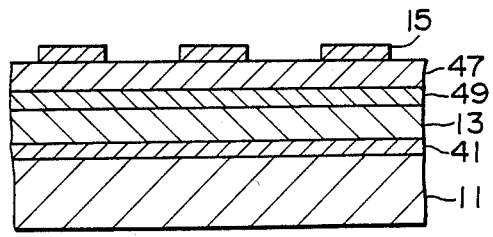

FIG. 4 is a schematic sectional view of still another example of a magneto-optical recording medium according to the present invention. This magneto-optical recording medium comprises a substrate 11, an undercoat layer 41, a magnetic oxide layer 13, a heat emitting layer 49 and a heat insulating layer 47 and a reflection layer 15, which layers are successively overlaid on the substrate 11.

The structure of this magneto-optical recording medium is the same as that of the magneto-optical recording medium shown in FIG. 3 except that the heat emitting layer 49 is independently provided. The heat emitting layer 49 can be made of, for example, Co spinel ferrite and Ni spinel ferrite. It is preferable that the thickness of the heat emitting layer 49 be in the range of about 0.1 $\mu$m to about 0.5 $\mu$m.

Using $BaO.5.5[Co_{0.1}Ti_{0.1}Al_{0.2}Fe_{1.6}O_3]$ as a target, a magnetic oxide layer having a thickness of 0.5 $\mu$m was formed on a GGG substrate by sputtering. On this magnetic oxide layer, a Cr layer having a thickness of 1000 Å was formed by vacuum deposition. A photoresist was applied to this Cr layer and a photo mask having a spiral band pattern was then brought into close contact with the applied photoresist, followed by exposure to light. Thereafter, it was immersed into a developer for wet development and was then subjected to post baking. The Cr layer was subjected to wet etching by a Cr etching liquid, so that a spiral band-shaped Cr reflection layer having a width of 1.5 $\mu$m was formed. Thus an example of a magneto-optical recording medium according to the present invention was prepared.

The photo mask employed in the above was prepared as follows: A photoresist was applied to a Cr film having a thickness of 1000 Å formed on a glass substrate. It was placed on a rotating substrate and exposed to argon laser beams as the laser beams were moved from the rotating center toward the circumference, with the focusing of a pick up being performed by a He—Ne laser, and subjected to development, post baking and Cr wet etching, whereby the above employed photo mask was prepared.

To the above obtained magneto-optical recording medium, a semi-conductor laser beam having a wavelength of 830 nm was applied with a laser output of 0.8 mW, and servo was conducted by the push-pull method. The result was that excellent tracking error signals were obtained, so that successful tracking was carried out.

According to the present invention, by using the magnetic oxide layer as a recording layer, in combination with the band-shaped reflection layers, accurate tracking can be attained with high C/N.

Further, because of the use of the magnetic oxide layer as the recording layer, the band-shaped reflection layers can be formed without difficulty by the photolithography using wet development and wet etching. Therefore, the magneto-optical recording medium according to the present invention is suitable for mass production.

What is claimed is:

1. A magneto-optical recording medium comprising a transparent substrate, a magnetic oxide layer formed on said substrate, and band-shaped reflection layers in the same plane formed on said magnetic oxide layer,
wherein said magnetic oxide layer comprises:
a magnetoplumbite-type ferrite having general formula (I):

$$MeO \cdot n(M_xFe_{(2-x)}O_3) \tag{I}$$

wherein Me represents at least one element selected from the group consisting of Ba, Pb, Sr and La; M represents one element or a combination of at least two elements which constitute a three-valence element or element group as a whole; x, $0 < x \leq 2$; and n, $5 \leq n \leq 6$,
a garnet-type magnetic oxide having general formula (II):

$$(R_3)(M^{3+}{}_yFe^{3+}{}_{5-y})O_{12} \tag{II}$$

wherein R represents at least one element selected from the group consisting of Y, Bi, Pb, Ca, Sr, Ba, La, Sm, Eu, Gd, Er, Tm, Yb, Lu, Pr, Nd, Ho and Dy; M represents at least one element selected from the group consisting of Ga, Al, V, Si, Ge, Co, Zn, Lu, Sc, Cr, Zr, Ti, Tb, Gd and Dy, by which Fe can be replaced; y, $0 \leq y \leq 3$;
or a cobalt spinel-type magnetic oxide having general formula (III):

$$Co_xM_yFe_{2-(x+y)}O_4 \tag{III}$$

wherein M represents at least one element selected from the group consisting of Al, Cr, Mn, Ni, Ti, Zn, Sn, Cu, Mg, Rh, V, Ga, Sb, Sc, Bi, Y, Su, Eu, Tb, Er, Yb, Ho, Dy, Tm, Gd, Sm, Pb, Re and Ru, by which Fe can be replaced; and x, y, $0 < x+y < 3$, $0 \leq y \leq =2$; and
wherein said band-shaped reflection layer has a reflectance of 30% or 80%, and a heat conductivity of less than 0.25 cal/cm.sec.°C. at 20° C.

2. The magneto-optical recording medium as claimed in claim 1, wherein said magnetic oxide layer comprises a magnetoplumbite-type ferrite having general formula (I):

$$MeO \cdot n[M_xFe_{(2-x)}O_3] \tag{I}$$

wherein Me represents at least one element selected from the group consisting of Ba, Pb, Sr and La; M represents one element or a combination of at least two elements which constitute a three-valence element or element group as a whole; x, $0 \leq x \leq 2$; and n, $5 \leq n \leq 6$.

3. The magneto-optical recording medium as claimed in claim 1, wherein said magnetic oxide layer comprises a garnet-type magnetic oxide having general formula (II):

$$[R_3][M^{3+}{}_yFe^{3+}{}_{5-y}]O_{12} \tag{II}$$

wherein R represents at least one element selected from the group consisting Y, Bi, Pb, Ca, Sr, Ba, La, Sm, Eu, Gd, Er, Tm, Yb, Lu, Pr, Nd, Ho and Dy; M represents at least one element selected from the group consisting of Ga, Al, V, Si, Ge, Co, Zn, Lu, Sc, Cr, Zr, Ti, Tb, Gd and Dy, by which Fe can be replaced; y, $0 \leq y \leq 3$.

4. The magneto-optical recording medium as claimed in claim 1, wherein said magnetic oxide layer comprises a cobalt spinel-type magnetic oxide having general formula (III):

$$Co_xN_yFe_{2-(x+y)}O_4 \tag{III}$$

wherein M represents at least one element selected from the group consisting of Al, Cr, Mn, Ni, Ti, Zn, Sn, Cu, Mg, Rh, V, Ga, Sb, Sc, Bi, Y, Su, Eu, Tb, Er, Yb, Ho, Dy, Tm, Gd, Sm, Pb, Re and Ru, by which Fe can be replaced; and x, y, $0 < x+y < 3$, $0 \leq y \leq =2$.

5. The magneto-optical recording medium as claimed in claim 1, wherein said magnetic oxide layer has a thickness of 1000 Å or more.

6. The magneto-optical recording medium as claimed in claim 1, wherein said magnetic oxide layer has a thickness ranging from 2000 Å to 5000 Å.

7. The magneto-optical recording medium as claimed in claim 1, wherein said transparent substrate is made of a glass selected from the group consisting of quartz glass, crystallized glass, and aluminosilicate glass.

8. The magneto-optical recording medium as claimed in claim 1, wherein said transparent substrate is made of a single or polycrystal of a material selected from the group consisting of garium.gadolinium.garnet (GGG), lithium tantalate $Al_2O_3$ and MgO.

9. The magneto-optical recording medium as claimed in claim 1, wherein said band-shaped reflection layer comprises a metal selected from the group consisting of Al, Nd, Cr and Pt.

10. The magneto-optical recording medium as claimed in claim 1, wherein said band-shaped reflection layer comprises an alloy selected from the group consisting of Fe—Ni, stainless steel, nickel chrome steel, and chromel.

11. The magneto-optical recording medium as claimed in claim 1, wherein each of said band-shaped reflection layers has a width ranging from 3/10 to 7/10 of the track pitch of said reflection layers.

12. The magneto-optical recording medium as claimed in claim 1, further comprising an undercoat layer between said substrate and said magnetic oxide layer, and a protective layer on said reflection layer.

13. The magneto-optical recording medium as claimed in claim 12, wherein said undercoat layer is a film made of a component selected from the group consisting of ZnO (001-plane), Mn-Zn ferrite (111-plane), Co spinel ferrite (111-plane), Co-Zn ferrite (111-plane) and MgO (111-plane).

14. The magneto-optical recording medium as claimed in claim 12, wherein said protective layer comprises a component selected from the group consisting of $SiO_2$, SiO, $TiO_2$, ZnO, $Al_2O_3$, AlN, $Si_3N_4$, C, TaC, TiC and ZrC.

15. The magneto-optical recording medium as claimed in claim 1, further comprising a het emitting undercoat layer between said substrate and said magnetic oxide layer, and a heat insulating layer between said magnetic oxide layer and said band-shaped reflection layers.

16. The magneto-optical recording medium as claimed in claim 15, wherein said heat emitting layer comprises a ferrite selected from the group consisting of Co spinel ferrite and Ni spinel ferrite.

17. The magneto-optical recording medium as claimed in claim 15, wherein said heat emitting undercoat layer has a thickness of about 0.1 μm to about 0.5 μm.

18. The magneto-optical recording medium as claimed in claim 15, wherein said heat insulating layer comprises a component selected from the group consisting of $Si_xO_y$, $Si_xN_y$, SiC, $Al_2O_3$, $ZrO_2$, $ThO_2$, CaO, $CeO_2$, $HfO_2$, and BeO.

19. The magneto-optical recording medium as claimed in claim 1, further comprising an undercoat layer between said substrate and said magnetic oxide layer, and a heat emitting layer and a heat insulating layer between said magnetic oxide layer and said reflection layers, with said heat insulating layer being overlaid on said heat emitting layer.

20. The magneto-optical recording medium as claimed in claim 19, wherein said heat emitting layer comprises a ferrite selected from the group consisting of Co spinel ferrite and Ni spinel ferrite.

21. The magneto-optical recording medium as claimed in claim 19, wherein said heat emitting layer has a thickness ranging from about 0.1 μm to about 0.5 μm.

* * * * *